Figure 1:
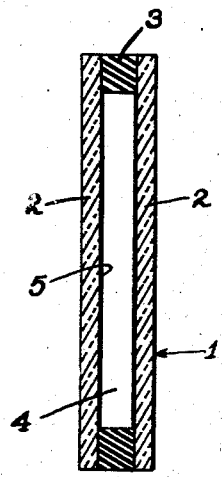

Sept. 30, 1941.  E. H. HAUX  2,257,680

METHOD OF PREVENTING INTERIOR FROSTING OF MULTIGLAZED UNITS

Filed Nov. 3, 1937

INVENTOR
ELMER H. HAUX
BY Bradley & Bee
ATTORNEYS

Patented Sept. 30, 1941

2,257,680

UNITED STATES PATENT OFFICE 2,257,680

METHOD OF PREVENTING INTERIOR FROSTING OF MULTIGLAZED UNITS

Elmer H. Haux, Tarentum, Pa., assignor to Pittsburgh Plate Glass Company, Allegheny County, Pa., a corporation of Pennsylvania Application November 3, 1937, Serial No. 172,570

1 Claim. (Cl. 20—56.5)

The present invention relates to multi-glazed units and more particularly to a method of preventing interior frosting of such units when they are exposed to low temperatures.

The primary object of my invention is to provide a method of nullifying the tendency of any moisture contained in the air entrapped in a multi-glazed unit to condense and freeze upon the glass walls of the unit with the accompanying impairment of transparency.

This and other objects of my invention will become more readily apparent during the course of the following detailed description.

Multi-glazed units have long been known to the art and because of their high thermal and sound insulating values they are today being used in a wide variety of installations. There is, however, one objection to these units and that is their tendency to frost when exposed to low temperatures. This frosting is occasioned by the condensation and freezing of moisture upon the glass sheets of the unit.

Despite all precautions during the manufacture or assembling of multi-glazed units, the air entrapped therein contains a small percentage of moisture or, in some instances, water vapor will enter the unit through the various joints therein. Although the percentage of moisture present in the unit will not be noticeable under ordinary conditions, when one face of the unit is exposed to temperatures in the range of minus 20° to minus 50° F. even small percentages of moisture will condense and freeze upon the inner surface of the cold glass sheet.

Attempts have been made to eliminate this objectionable frosting of multi-glazed units by the addition of various dehydrating chemicals thereto or by filling the air space with an anhydrous gas. The workers in the prior art have concentrated on a positive removal of all water vapor from the air entrapped in multi-glazed units.

It has now been found that by introducing into the entrapped air space of multi-glazed units a liquid miscible with water and capable of forming a low freezing point solution therewith, freezing of water vapor upon the glass walls of the unit will be prevented. The liquid may have a high vapor pressure, in which case it forms a gaseous mixture with the entrapped air and combines with the water to produce a low freezing point solution, or it may have a low vapor pressure in which case it catches and dissolves the molecules of water vapor and removes them from the entrapped air.

Figure 2:
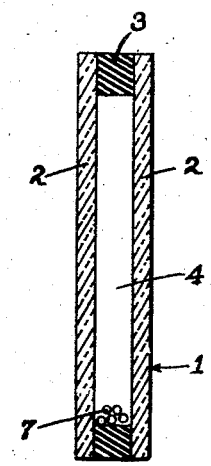

Certain embodiments of my invention are shown in the accompanying drawing, wherein:

Figure 1 is a vertical sectional view of a double glazed unit including interior frost preventives, and Figure 2 is a vertical sectional view of a double glazed unit containing another form of frost prevention means.

Referring to the drawing, a double glazed unit 1 comprises sheets or plates 2 of glass secured and maintained in spaced relation by strips 3 of rubber or other resilient material with an entrapped air space 4. Films 5 of a liquid, such as glycerol, having a low vapor pressure are applied to the interior surfaces of the plates 2.

An example of another form of the invention is illustrated in Figure 2 of the drawing wherein a liquid having a high vapor pressure is introduced into the air space 4 and vaporizes to fill such air space. Under conceivable conditions of temperature, these vapors will liquefy and the condensate will deposit in droplets 7 at the bottom of the air space 4.

The use of a liquid of a high vapor pressure, such as methyl alcohol, acetone, chloral, and ethylamine is particularly desirable for treating those units which have already been assembled and placed in service. Methyl alcohol and acetone are more practical from a commercial standpoint, not only because they are less expensive, but also because they are more readily available. To treat a unit, a small amount of one of the disclosed liquids is introduced into the air space, wherein it vaporizes very rapidly and the vapors combine with the water vapor contained in such air space. The amount of liquid added, of course, depends upon the amount of moisture contained in the unit and will vary somewhat with each unit. An excess of the treating liquid will not affect the unit assembly and may be added without serious results. It is, however, essential that sufficient liquid be added to the unit that the resulting mixture will have a low freezing point. For example, when acetone is used it must be added in sufficient quantities that there will be substantially four times as much acetone as water contained in the unit. A solution of this strength has a freezing point of approximately minus 40° F., and no frosting can occur until the temperature within the unit has been reduced at least to this point.

The use of a liquid having a low vapor pressure is particularly desirable for treating the units prior to the assembly thereof. The most effective results are obtained by spreading a thin layer of the liquid over the inner surfaces of the glass sheets before they are placed in the unit. Accordingly, it will at once be evident that the treating liquid should have approximately the same index of refraction as the glass in order to prevent distortion of the transmitted light and it is also necessary that the liquid "wet" the glass in order that a uniform film may be maintained thereover. Further requisites of the selected liquids are that they be miscible with water and form therewith a low freezing point solution. Liquids having a low vapor pressure which are adaptable for the present purpose include, glycerol, the higher ethers of diethylene glycol, diacetin, etc., as typical examples.

It will be seen, therefore, that the addition of liquid to a multi-glazed unit by either of the disclosed processes affords a measure of protection heretofore unattainable. After the treated units have been in use for a considerable period of time, subsequent additions of the treating liquid can be made if considered desirable or necessary to maintain a high degree of protection.

A further advantage arises from this treatment in that it serves to prolong the effective life of multi-glazed units by the elimination of another cause of failure thereof. Water condensed upon a glass surface will partially dissolve the glass with the production of an unsightly stain. Obviously stained glass detracts from the appearance and utility of a multi-glazed unit and the glass must be replaced. It has been observed, however, that chemical deterioration of the inner surfaces of the glass panes forming the multi-glazed unit is substantially obviated by the addition of the treating liquid to the unit. While a satisfactory explanation of this phenomenon has not been reached as yet, laboratory tests have definitely proven its existence. Therefore, should there be any condensation upon the glass sheets of a treated multi-glazed unit, the glass will not be attacked and stained.

What I claim is:

A multi-glazed unit comprising spaced parallel sheets of glass, the spaces between the sheets containing the vapors of acetone.

ELMER H. HAUX.